July 29, 1930. M. O. SNEDIKER 1,771,821
RETARDED GRADUAL ACTING DIFFERENTIAL RELAY
Original Filed Oct. 25, 1928
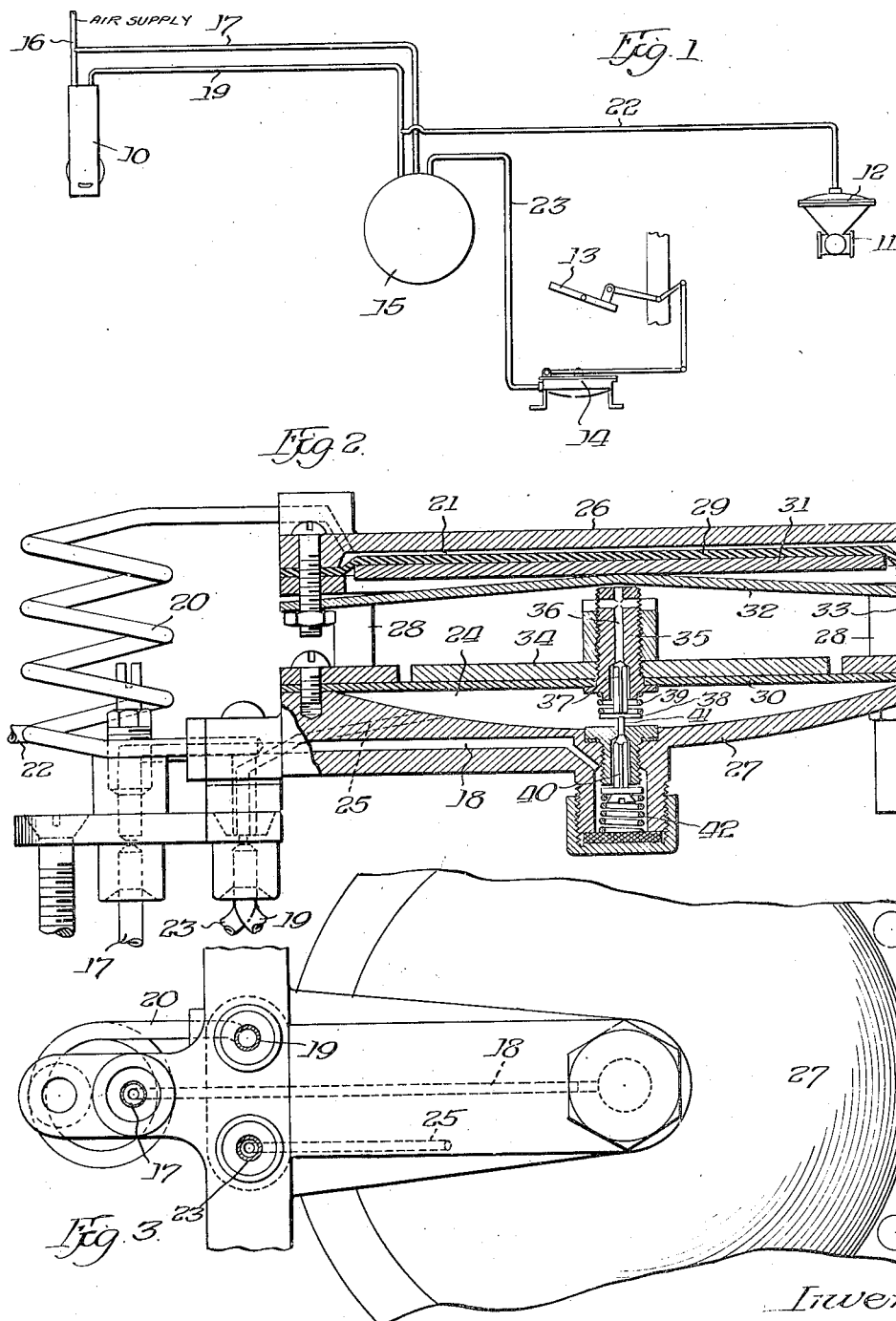
Inventor
Morton O. Snediker Patented July 29, 1930

1,771,821

UNITED STATES PATENT OFFICE

MORTON O. SNEDIKER, OF CHICAGO, ILLINOIS, ASSIGNOR TO POWERS REGULATOR COMPANY, OF CHICAGO, ILLINOIS, A CORPORATION OF ILLINOIS

RETARDED GRADUAL ACTING DIFFERENTIAL RELAY

Application filed October 25, 1928, Serial No. 314,922. Renewed December 28, 1929.

My invention relates to thermostatic regulating devices, and particularly to a novel construction and arrangement by which a new result is accomplished.

The conditioning of the air in enclosed spaces such as theatres, schools, and factories involves a plurality of operations all of which must be co-related if satisfactory results are to be obtained. For example, the maintenance of a specified relative humidity requires not only that the temperature, but the supply of moisture must be controlled; in the air changing and conditioning apparatus for theatres and schools conditions arise that make desirable a variation of the amount of outside air admitted into the circulating system, and numerous similar problems might be stated.

In other words, for proper control of the air within a space at least two instrumentalities must be employed in co-ordinated relation. The primary control is of the heat, while the secondary control is usually of the apparatus affecting the moisture content of the air. As stated, these two controls should be co-ordinated and related to each other, but it does not follow that the secondary control should operate simultaneously with the primary control; in fact, it is in most cases desirable that the secondary control should be delayed and a differential effect provided.

This result is secured in the apparatus here disclosed. The mechanism is capable of practically unlimited variation between simultaneous action with the thermostat, and no action whatever; also a wide range of variation in the speed of operation of the secondary control after operation thereof has begun. The designing engineer has therefore a wide variation of processes or methods of maintaining a desired condition of the air.

The invention will be more readily understood by reference to the accompanying drawings, in which Fig. 1 is a diagrammatic view showing a lay-out in which my invention is utilized;

Fig. 2 is a sectional view through the relay mechanism and

Fig. 3 is a bottom plan view thereof.

Referring to Fig. 1, I have illustrated diagrammatically a thermostat 10, of the air pressure type, a steam valve 11, diaphragm controller 12 for the valve, and a damper 13 connected by links to a second diaphragm controller 14. A relay is indicated generally by the numeral 15. A pipe 16 is connected to a source of air under pressure, the pipe leading directly into the thermostat 10, while a branch 17 from the pipe 16 is in direct communication with the passage 18 in the relay.

A pipe 19 is connected to the outlet side of the thermostat and at its opposite end communicates with a coil 20 which is in turn in communication with the space 21 in the relay. A branch pipe 22 communicates with the diaphragm valve control 12.

A pipe 23 is connected at one end to the relay and communicates with the space 24 and outlet 25, and at the other end with the diaphragm controller 14.

The relay comprises a casing having upper and lower walls, 26, 27 joined by struts 28. Two diaphragms 29, 30 are appropriately held at their margins and constitute flexible walls for the spaces 21—24. A disc 31 bears against the diaphragm 29, the outward movement of which is resisted by the flat spring 32. Suitable means such as the nuts 33 are provided for adjusting the force exerted by the spring.

A smaller disc 34 bears against the diaphragm 30, the disc carrying a projection 35, the upper end of which contacts the spring 32.

This projection is for convenience threaded into the disc 34 and has an air escape opening 36 controlled by a valve 37 provided with a head 38. A spring 39 bears against the head and tends to unseat the valve.

A second valve 40 controls the entrance of air from the passage 18 into the chamber 24, the valve having an end projection 41 in contact with the head 38 of the valve 37. A spring 42, somewhat stronger than the spring 39, bears against the valve 40 and tends to seat it.

The operation is as follows: Assuming that the valve 11 controls a supply of steam for heating purposes and the damper 13 controls an air passage through which a supply of air, either high or low in moisture content, is admitted to the apartment. Assume also that the pipe 16 and the branch 17 are in direct communication with a source of air under pressure and that the parts are adjusted for a predetermined condition.

When the temperature of the space within which the thermostat is located is raised, a small volume of air will be admitted past the thermostat into the pipe 19 and branch 22 and will begin to exert its force on the diaphragm 12 controlling the steam valve 11. This air under pressure will simultaneously be admitted into the space 21 of the relay through the pipe 20, and tend to force the diaphragm 29 downwardly. Immediate movement of the diaphragm will be prevented due to the force of the spring 32 and the small amount of pressure exerted on the diaphragm. However, as the pressure builds up in the space 21, due to the increased admission by the thermostat, the spring 32 will finally be overcome and a slight downward movement effected which is transmitted to the projection 35 and through the valve 37 to the valve 40 slightly opening the same and admitting air directly from the source of pressure through the pipe 17. Air under pressure so admitted into the space 24 is immediately effective on the diaphragm 30 and against the smaller disc 34 thus tending at once to neutralize the pressure in the space 21, and to add to the force of the spring 32.

It will be seen, therefore, that the extent of delayed operation of the damper 13 is dependent on the strength and adjustment of the spring 32, while the gradual operation of the damper 13 is dependent on the relative sizes of the discs 31 and 34. Any desired differential in operation of the two controls may be secured by proper design of the two discs and any extent of delayed operation of the second control may be secured by the design of the spring 32.

After pressure has been built up in the space 24, it is transmitted through the outlet 25 and pipe 23 to the diaphragm 14, the gradual operation of which is dependent on the speed with which pressure is permitted to build up in the space 24. Upon a reversal of operating conditions, a reduction of pressure occurs in the space 21 due to the shutting off of the thermostat, which permits a retraction of the parts, the seating of the valve 40, the unseating of the valve 37 due to the spring 39 and the escape of the air in the space 24.

By proper design and adjustment of the described parts, any desired control may be effected. I am aware that it is not new to utilize a relay by means of which the air pressure admitted through a thermostat may be amplified as required for the operation of numerous secondary controls, but I believe it to be novel to so design the relay that any desired delayed or differential action may be secured.

The preceding description is based on the use of a so-called direct-acting thermostat in which air under pressure is allowed to pass the thermostat to the valve diaphragm as the temperature rises. It will be understood however, that a thermostat of the reverse acting type may be employed with equal facility, that is, a thermostat in which air under pressure is allowed to pass the thermostat when the temperature is lowered.

In the description and in the claims, I have referred to a thermostat as a regulating or controlling instrument. I wish it understood, however, that I contemplate the employment of a hygrostat in place thereof, inasmuch as under some conditions it is preferred that the primary control be of the moisture content, the secondary control being of some other element of the air condition.

Other apparatus may be designed for accomplishing this purpose, and I do not wish to be limited except as indicated in the appended claims.

I claim:

1. In an air conditioning system, the combination of a thermostat, two independent fluid controls, means directly actuated by said thermostat for actuating one of said controls, a relay, and means actuated by said thermostat through said relay for actuating said second control in different timed relation from said first control.

2. In an air conditioning system, the combination of a thermostat, two independent fluid controls, means directly actuated by said thermostat for actuating one of said controls, a relay, and means acting through said relay and operable by the same force that actuates said first control for actuating said second control in different timed relation from said first control.

3. In an air conditioning system, the combination of a thermostat, two independent fluid controls, means directly actuated by said thermostat for actuating one of said controls, a relay and means acting through said relay and controlled by said thermostat for effecting a delayed beginning and a subsequent gradual action of said second control.

4. In an air conditioning means, the combination of a thermostat, a heat control, and an air condition control, means operated by the thermostat for directly regulating the heat control, a relay, means operated by the same thermostat and utilizing the same motivating force as that used for regulating the heat control, for regulating the air condition control in a different timed relation from said heat control.

5. In combination, a thermostat of the air pressure type, a pair of fluid controls, a relay, means directly connecting said thermostat and said relay to a source of air under pressure, a pipe extending from the thermostat directly to one control, a connection from said pipe to said relay, and means in said relay actuated by the pressure admitted through said pipe for affecting said second control by the air from said source of air pressure.

6. In combination, a thermostat of the air pressure type, a pair of fluid controls, a relay, means directly connecting said thermostat and said relay to a source of air under pressure, a pipe extending from the thermostat directly to one control, a connection from said pipe to said relay, and means in said relay actuated by the pressure admitted through said pipe for affecting said second control by means of the air from said source of air pressure, said last named means effecting a delayed and gradual operation of said second control.

7. In combination, a thermostat of the air pressure type, a pair of controls, a relay, a pipe directly connecting the thermostat to one control, and also communicating with said relay, means directly connecting said thermostat and said relay to a source of air under pressure, a pair of diaphragms in said relay in opposed relation, a second pipe connecting said relay to said second control, and means operated by one diaphragm under the pressure admitted through said first pipe for admitting the air from said source of supply to said second pipe for operating said second control.

8. In combination, a thermostat of the air pressure type, a pair of controls, a relay, a pipe directly connecting the thermostat to one control, and also communicating with said relay, means directly connecting said thermostat and said relay to a source of air under pressure, a pair of diaphragms in said relay in opposed relation and of different effective areas, a second pipe connecting said relay to said second control, and means operated by one diaphragm under the pressure admitted through said first pipe for admitting the air from said source of supply to said second pipe for operating said second control.

9. In combination, a thermostat of the air pressure type, a pair of controls, a relay, a pipe directly connecting the thermostat to one control, and also communicating with said relay, means directly connecting said thermostat and said relay to a source of air under pressure, a pair of diaphragms in said relay in opposed relation and of different effective areas, the larger of said diaphragms being spring opposed, a second pipe connecting said relay to said second control, and means operated by one diaphragm under the pressure admitted through said first pipe for admitting the air from said source of supply to said second pipe for operating said second control.

10. In combination, a thermostat of the air pressure type, two controls, a relay, means connecting said thermostat and said relay to a source of air under pressure, a pipe extending from the thermostat outlet to the first control, said pipe also being connected to the relay, a pipe connecting the relay outlet to the second control, and means in said relay operated by the pressure admitted thereto by the thermostat for admitting pressure to said relay from said source and for rendering said admitted pressure gradually effective on said second control.

11. In a relay for effecting a delayed gradual action of a secondary control, the combination of a casing providing a pair of chambers, diaphragms closing said chambers, and arranged in opposed relation, one diaphragm having a greater effective area than the other, a spring for resisting outward movement of the larger diaphragm, and means controlled by the outward movement of the larger diaphragm for admitting air under pressure into the chamber that is closed by the smaller diaphragm, the pressure admitted into said last named chamber being exerted on said smaller diaphragm and augmenting the force of the spring tending to retract the larger diaphragm.

12. In a relay for effecting a delayed gradual action of a secondary control, the combination of a casing providing a pair of chambers, diaphragms closing said chambers and arranged in opposed relation, discs overlying said diaphragms and serving to take up the thrusts thereof, one disc having a greater area than the other, means connecting said discs in abutting relation, an inlet and an exhaust valve controlled by the smaller disc, and a spring tending to collapse the diaphragm associated with the larger disc, air under pressure acting on said last named diaphragm tending to collapse the smaller diaphragm and to open said inlet valve to admit pressure into the chamber associated with the smaller diaphragm to effect operation of said secondary control.

In testimony whereof I have affixed my signature.

MORTON O. SNEDIKER.